(12) United States Patent
Heintzen et al.

(10) Patent No.: US 6,283,007 B1
(45) Date of Patent: Sep. 4, 2001

(54) REGULATING CYLINDER AND PISTON UNIT AND METHOD OF UTILIZING THE SAME

(75) Inventors: Dirk Heintzen, Hagen; Detlef Axmacher, Iserlohn, both of (DE)

(73) Assignee: AFT Atlas Fahrzeugtechnik GmbH, Werdohl (DE)

( * ) Notice: Subject to any disclaimer, the term of this patent is extended or adjusted under 35 U.S.C. 154(b) by 0 days.

(21) Appl. No.: 09/252,295

(22) Filed: Feb. 18, 1999

(30) Foreign Application Priority Data

Feb. 20, 1998 (DE) .............................. 198 07 342

(51) Int. Cl.[7] ...................................... F01B 7/20
(52) U.S. Cl. .................................. 91/173; 92/52
(58) Field of Search .................. 91/172, 173; 92/51, 92/52, 13.1, 13.4, 13.6

(56) References Cited

U.S. PATENT DOCUMENTS 1,066,483 * 7/1913 Fournia .................................. 92/13
5,706,712 * 1/1998 Tischer et al. ........................ 91/173

* cited by examiner

Primary Examiner—Edward K. Look
Assistant Examiner—Michael Leslie
(74) Attorney, Agent, or Firm—Darby & Darby

(57) ABSTRACT

A cylinder and piston unit, which can be utilized to select the gears of and/or to shift a change-speed transmission in the power train of a motor vehicle, has a housing provided with two internal chambers and internal stops and receiving a reciprocable assembly of three pistons including two interconnected pistons each adjacent a different one of the two chambers and a hollow cylindrical piston which surrounds one of the two interconnected pistons. The chambers can receive a pressurized hydraulic or pneumatic fluid jointly or independently of each other to thus effect movements of the interconnected pistons (with and/or relative to the holow piston) against selected stops and to thus select the positions of the interconnected pistons. Such interconnected pistons can be utilized to select the ratio of the change-speed transmission. The chambers can confine springs which assist or oppose the action of fluid upon the surfaces of the interconnected pistons.

16 Claims, 2 Drawing Sheets

REGULATING CYLINDER AND PISTON UNIT AND METHOD OF UTILIZING THE SAME

BACKGROUND OF THE INVENTION

The invention relates to regulating or adjusting methods and apparatus, and more particularly to improvements in methods of and apparatus for effecting movements of one or more mobile components to any one of a plurality of different positions. For example, the improved method and apparatus can be resorted to for selecting and/or changing the positions of one or more mobile parts of a change-speed transmission in the power train of a motor vehicle. Still more particularly, the invention relates to improvements in cylinder and piston units wherein a mobile part (such as one or more pistons) is movable in a housing or body between two or more different positions.

It is often necessary to move one or more components of a prime mover or a motion transmitting unit between two or more positions and to reliably retain the component(s) in the selected position(s). Examples of such apparatus are so-called actuators, i.e., devices which can perform an action or can output signals in response to signals from a control system (e.g., a computer). Heretofore known apparatus of the just outlined character normally comprise or constitute electric stepping motors or fluid-operated (hydraulic or pneumatic) cylinder and piston units. A drawback of such conventional apparatus is that their controls are rather complex, expensive, bulky and/or (often) unreliable. As a rule, or at least in many instances, the controls include or constitute one or more circuits designed to compare the desired position(s) of one or more mobile components with the actual position(s), and to transmit to the actuator signals at least when the desired position(s) departs or depart from the actual (ascertained or monitored) position(s). In addition to the circuit(s), such control systems must embody one or more position- or movement-monitoring sensors, auxiliary circuits and/or others.

OBJECTS OF THE INVENTION

An object of the invention is to provide a novel and improved method of locating one or more mobile components in any one of at least two different positions in a simple, efficient, reliable, time-saving and reproducible manner.

Another object of the invention is to provide a novel and improved method of regulating the operation of a fluid-operated cylinder and piston unit, A further object of the invention is to provide a novel and improved method of selecting and/or changing the ratio of a manually or automatically shiftable transmission in the power train of a motor vehicle.

An additional object of the invention is to provide a method which ensures reliable retention of one or more mobile components (such as pistons or plungers) in two or more different positions.

Still another object of the invention is to provide a method which can be practiced by resorting to a simple, compact, reliable and highly versatile apparatus, particularly a unit wherein a cylinder is designed to receive two or more reciprocable pistons, plungers or analogous mobile components.

A further object of the invention is to provide a novel and improved apparatus, particularly a fluid-operated cylinder and piston unit, for the practice of the above outlined method.

Another object of the invention is to provide the apparatus with a novel and improved housing (such as a cylinder) and with a novel and improved assembly of mobile components (such as pistons) in the housing.

An additional object of the invention is to provide an apparatus which can accomplish the above outlined objects and the operation of which merely necessitates the provision of a source of pressurized hydraulic or pneumatic fluid.

Still another object of the invention is to provide a novel and improved combination of pistons and resilient elements (such as coil springs) for use in the housing or body or cylinder of the above outlined apparatus.

A further object of the invention is to provide the apparatus with novel and improved means for transmitting motion from its mobile constituent(s) to one or more controlled or regulated parts or systems.

Another object of the invention is to provide a transmission which can be controlled by or which can embody the above outlined apparatus.

An additional object of the invention is to provide a power train which can be put to use in a motor vehicle and wherein at least one system (such as a manual or automated or automatic transmission) can be combined with or can cooperate with or can embody an apparatus of the above outlined character.

A further object of the invention is to provide a novel and improved method of selecting the gears of and of shifting a change-speed transmission.

SUMMARY OF THE INVENTION

One feature of the invention resides in the provision of a method of locating—in at least two different positions—an assembly of pistons which are movable with and/or relative to each other in a housing forming part of a fluid-operated (hydraulic or pneumatic) cylinder and piston unit and having a plurality of chambers with ports for selective admission and evacuation of a fluid at a selected one of a plurality of different pressures, The improved method comprises at least one step, namely the step of regulating the admission and evacuation of fluid into and from the chambers of the housing to thus effect at least one of (a) movements of at least one piston of the assembly relative to the housing, and (b) movements of at least one piston relative to at least one other piston of the assembly.

In accordance with a presently preferred embodiment, the improved method can be resorted to in order to locate an assembly of plural pistons in at least two different Positions in a housing forming part of a fluid-operated cylinder and piston unit and having (a) a plurality of chambers with Ports for selective admission and evacuation of a fluid at a selected one of a plurality of different pressures within a predetermined range of pressures and (b) a plurality of stops for a first piston of the assembly. This method can comprise the steps of:

(a) introducing pressurized fluid into one of the chambers to thus move the first piston against a first one of the plurality of stops;

(b) introducing pressurized fluid into another of the chambers to thus move the first piston against a second one of the plurality of stops;

(c) altering the pressure of fluid in at least one of the chambers to thereby move at least one other piston of the assembly into abutment with the first piston while the first piston abuts one of the first and second stops to thus determine one of the plurality of different positions; and (d) altering the pressure of fluid in at least one of the chambers to thereby move the at least one other piston into abutment with the first piston while the first piston abuts the other of the first and second stops to thus determine another one of the plurality of different positions.

Another feature of the invention resides in the provision of a cylinder and piston unit which comprises:

(1) a housing having a plurality of chambers, ports communicating with the chambers, and spaced-apart first and second internal stops;

(2) means for supplying to and for receiving from the Ports a fluid at selected one of a plurality of pressures within a range of different pressures; and (3) a piston assembly including a first piston which is movable in the housing between first and second positions in which the first piston respectively engages (such as abuts against) the first and second stops. The first piston is movable Lo such positions in response to a change of fluid pressure in at least one of the plurality of chambers, and the assembly further comprises at least one second piston which is movable in the housing relative to the first piston in at least one of the first and second positions of the first piston in response to changes of fluid pressure in at least one of the chambers.

The piston assembly can comprise a third piston which is movable in the housing jointly with the second piston. The pistons of the assembly have surfaces (such as end faces) each of which is being acted upon by fluid in one of the chambers. The surface of at least one of the pistons has an area which is different from the area of the surface of at least one other piston. For example, the area of the surface of the third piston is or can be smaller than the area of the surface of the second piston.

The areas of surfaces of the pistons and the positions of surfaces relative to the respective chambers can be selected in such a way that the admission of pressurized fluid into the chambers entails a movement of the first piston against one of the first and second stops and a movement of the second and third pistons to a first position relative to the first piston. The admission of pressurized fluid into one of the chambers can entail a movement of the first piston against the other of the first and second stops, and the admission of pressurized fluid into another of the chambers can result in a movement of the second and third pistons against a further stop in the housing.

The surfaces of the first and third pistons can be positioned to be acted upon by fluid in one and the same chamber.

The cylinder and piston unit can further comprise a first resilient element (such as at least one coil spring) which is arranged to urge the first piston in a first direction against the first stop, and a second resilient element (such as at least one coil spring) which is arranged to urge the second arid third pistons in a second direction counter to the first direction. Each of the resilient elements is or can be at least partially confined in one of the chambers, i.e., each such resilient element can be confined in a discrete chamber. The first piston can abut the first stop with a predetermined force under the action of the resilient elements when the fluid in the chambers is not pressurized. If the area of the surface of the third piston is smaller than the area of the surface of the second piston arid the surfaces of the first and third pistons are acted upon by fluid in one of the chambers, the resilient element which is confined in such one chamber can be installed to bias the third piston in the second direction in order to increase the volume of such chamber. Furthermore, such resilient element can be arranged to bias the first piston against the first Stop.

If the area of the surface of the third piston is smaller than the area of the surface of the second piston, and if the chambers include first and second chambers which are respectively adjacent the second and third pistons, the second and third pistons can be arranged to assume relative to the housing four different positions. In the first position, the second chamber contains pressurized fluid to maintain one of the second and third pistons in abutment with a third stop of the housing. Neither of the chambers contains pressurized fluid in the second Positions of the second and third pistons. The chambers contain pressurized fluid in the third Positions of the second and third pistons, and an entwining Portion of one of the second and third pistons abuts the first piston. The first chamber contains pressurized fluid in the fourth positions of the second and third pistons, and the first piston then abuts the second stop.

The entwining portion can be provided on or can be connected with the third piston, and such entraining portion can be biased against the first piston by the resilient element in that chamber wherein the fluid acts upon the surface of the third piston; such surface is or can be smaller than the surface of the second piston. The first piston can comprise or constitute a sleeve having an external surface which is slidable along an internal surface of the housing, and an internal surface which is slidable along an external surface of one of the second and third pistons.

The bias of the resilient element which acts upon the third piston to thus urge the first piston against the first stop is opposed by the bias of the resilient element in the other chamber in a direction to move the entraining portion of the third piston away from the second piston.

The pressures of fluid which is being admitted into the one or the other chamber and the characteristics of the resilient elements can be (and preferably are) selected in such a way that, when the pressure of fluid in the chambers is maintained at predetermined values or within predetermined ranges of values, the pistons assume and are maintained with predetermined forces in one or more or all of the plurality of different positions relative to the housing.

At least one of the pistons preferably abuts one of the stops in each of the plurality of different positions of the pistons relative to the housing.

At least one of the pistons can form Part of or can carry or transmit motion to a part (e.g., a shaft) of a change-speed transmission. The transmission can form Part of a power train in a motor vehicle, and the at least one piston can be arranged to shift the transmission into any one of a plurality of different gears in response to movement of the at least one piston relative to the housing. Alternatively, the at least one piston can be utilized to select a particular gear preparatory to shifting of the transmission into such gear.

The novel features which are considered as characteristic of the invention are set forth in particular in the appended claims. The improved cylinder and piston unit itself, however, both as to its construction and its mode of operation, together with numerous additional important and advantageous characteristics and features thereof, will be best understood upon perusal of the following detailed description of certain presently preferred specific embodiments with reference to the accompanying drawings.

DESCRIPTION OF PREFERRED EMBODIMENTS

Figure 1:
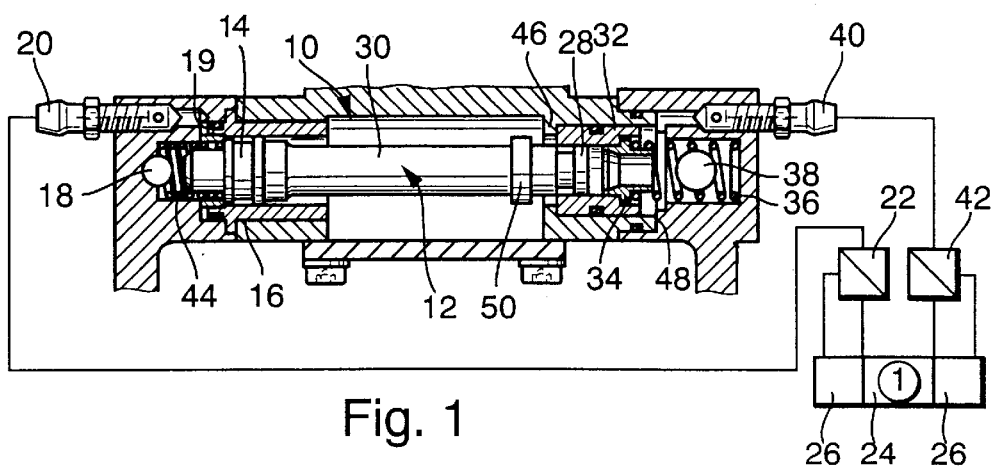
FIG. 1 is a partly schematic elevational and in part longitudinal sectional view of a cylinder and piston unit which embodies one form of the invention, the piston assembly being shown in one of several different positions.

FIG. 1 shows a fluid-operated cylinder and piston unit having a composite cylinder or body or housing 10 and a piston assembly 12. The latter comprises a hollow sleeve-like first piston 32, a second piston 14 and a third piston 28. The pistons 14 and 28 are (or can be) rigidly connected to each other by an elongated shaft 30 which carries a stop 50 in the form of a collar. The piston 14 is reciprocable in a bearing sleeve 16 and its exposed surface (namely its left-hand end face) can be acted upon by fluid in a chamber 18 adapted to receive or discharge pressurized fluid by way of at least one port receiving one end portion of a conduit 20 leading to one port of a valve 22. The latter has two additional Ports one of which can receive pressurized fluid from a suitable source 24 (e.g., a pump or an accumulator) and the other of which is connected to a source 26 of non-pressurized fluid. The fluid is assumed to be oil or another suitable hydraulic fluid. However, it is equally possible to utilize a pneumatic fluid.

The bearing sleeve 16 is anchored in the housing 10 against axial movement with the second piston 14 and confines a ring 19 which constitutes an abutment or stop serving to limit the extent of leftward movement of the second piston 14 (i.e., of the pistons 14, 28 and the shaft 30).

The housing 10 defines a second chamber 38 which is adjacent the exposed surface (right-hand end face) of the third piston 28. This chamber communicates with at least one Port provided in the housing 10 and receiving one end portion of a conduit 40 leading to one Port of a second valve 42 which is (or which can be) identical with the valve 22 and is also connected with the sources 24, 26. The area of the exposed surface of the piston 28 (i.e., of that surface which can be acted upon by fluid in the chamber 38) is smaller than the area of the exposed surface of the piston 14 at the chamber 18.

The cylinder and piston unit of FIG. 1 further comprises an annular entraining portion 34 which is biased in a direction to the left by a resilient element 36 installed in the chamber 38 and reacting against the right-hand end wall of the housing 10. When the chamber 38 receives pressurized fluid (from the source 24 by way of the valve 42 and conduit 40), such fluid acts upon the exposed surfaces of the pistons 28, 32 and is assisted by the bias of the resilient element 36. The illustrated resilient element 36 is a coil spring.

A second resilient element 44 (shown in the form of a coil spring) is installed in the chamber 18 to react against the left-hand end wall of the housing 10 and to bear upon the exposed surface of the second piston 14. The bias of the spring 44 exceeds the bias of the spring 36, i.e., the spring 36 is more readily deformable than the spring 44.

Figure 2:
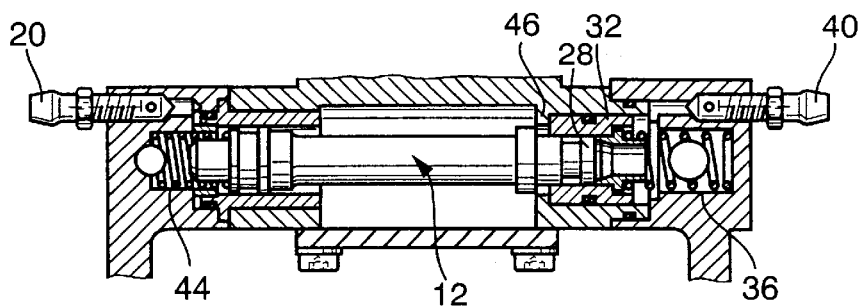
FIG. 2 shows a portion of the structure of FIG. 1, with the piston assembly in a second position.
Figure 3:
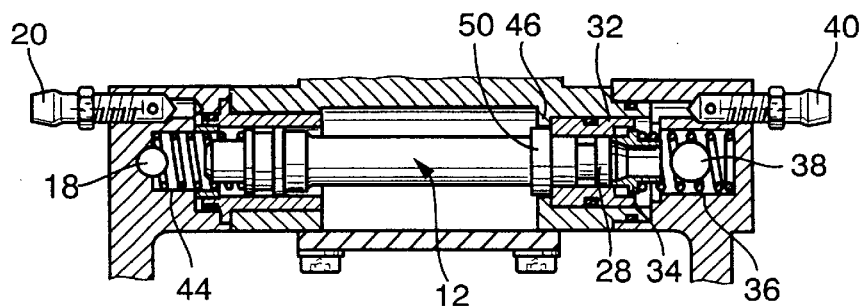
FIG. 3 shows the structure of FIG. 2, with the piston assembly in a third position.
Figure 4:
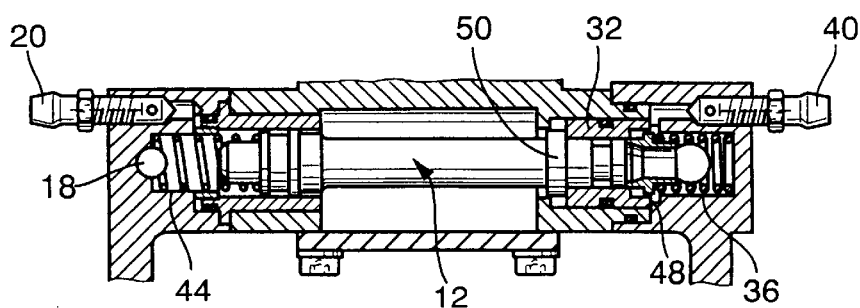
FIG. 4 shows the structure of FIGS. 2 and 3, with the piston assembly in a fourth position.

The first piston 32 is movable in the housing 10 between two axially spaced-apart internal stops 46 and 48 of the housing, The stop 46 is constituted by an annular portion of the housing 10 and its central axial hole or passage has a diameter which exceeds the outer diameter of the collar 50 on the shaft 30, i.e., the collar 50 is movable through the stop 46 between the positions shown in FIGS. 1–2 and the position shown in FIG. 4 (and through the intermediate position shown in FIG. 3). As can be seen in FIGS. 3 and 4, the collar 50 can be moved all the way into abutment with the left-hand end face of the first piston 32.

The effective surfaces of the pistons 14, 28, 32 and the characteristics of the resilient elements 36, 44 are related to a predetermined (selectable) fluid pressure (furnished by the source 24 and, if necessary, modified by the valve 22 and/or 42) in such a way that, depending on the selected pressure of fluid which is supplied to the chamber 18 via conduit 20 and/or to the chamber 38 via conduit 40, the piston assembly 12 can be caused to assume a selected one of the following four axial positions:

(1) If the valve 42 is actuated to connect the source 24 with the conduit 40 (and hence with the chamber 38), and if the valve 22 establishes communication between the conduit 20 (chamber 18) and the source 26 of (or receptacle (sump) for) non-Pressurized fluid, pressurized fluid in the chamber 38 assists the bias of the resilient element 36 to move the pistons 14, 28 in a direction to the left (to the axial positions shown in FIG. 1) so that the resilient element 44 is caused to store energy (or to store additional energy). The first piston 32 then abuts the (first) stop 46, and the second piston 14 abuts the (third) stop 19. The increased bias of the resilient element 44 is then opposed by the bias of the weaker resilient element 36 and by the fluid pressure in the chamber 38, and the relationship of such forces is selected with a view to ensure that the second piston 14 is biased against the stop 19 with a predetermined force. Otherwise stated, the bias of the resilient element 36 and the pressure of fluid in the chamber 38 exceed the then bias of the resilient element 44 to an extent which suffices to ensure that the piston 14 continues to abut the stop 19 even if the bias of the resilient element 36 and/or the pressure of fluid in the chamber 38 fluctuates within a certain range. For example, the effect of hysteresis can cause the fluid pressure in the chamber 38 to exceed or to drop below a desired or optimum pressure. The just described axial positions of the rigidly interconnected pistons 14, 28 correspond to the left-hand end position of the piston 14, and the piston 32 bears upon the first internal stop 46.

(2) The second positions of the pistons 14, 28 and 32 are shown in FIG. 2. This Figure (as well as each of the FIGS. 3 and 4) references only some of the parts of the improved cylinder and piston unit. The chambers 18 and 38 communicate with the source 26 (via conduits 20, 40 and valves 22, 42, not shown in FIGS. 2, 3 and 4), and the stronger resilient element 44 causes the weaker resilient element 38 to store energy (or to store additional energy) whereby the resilient element 36 bears upon the entraining portion 34 of or on the piston 32 and causes the piston 32 to abut the stop 46. The piston 32 is then maintained in the left-hand end position relative to the rigidly interconnected parts 14, 30, 50 and 28. The bias of the then highly stressed resilient element 36 considerably exceeds the then bias of the resilient element 44 (which has dissipated at least some of its energy) so that the piston 32 abuts the stop 46 and the entraining portion 34 is caused to bias the piston 32 against the stop 46 even if the bias of the resilient element 44 and/or 36 departs from an optimum bias to a considerable extent. Such axial positions remain intact even if the pressure in the chamber 44 and/or 38 departs from zero pressure to a predetermined extent.

(3) FIG. 3 shows the pistons 14, 28 and 32 in the axial positions which they assume when the valves 22, 42 are adjusted or set to simultaneously connect the source 22 of pressurized fluid with the two chambers 44, 38. Pressurized fluid in the chamber 38 acts upon the right-hand end face of the first piston 32 so that the piston 32 abuts the first stop 46. Pressurized fluid in the chamber 44 acts upon the exposed surface (left-hand end face) of the second piston 14, and such hydraulic force is assisted by the bias of the resilient element 44. Therefore, the pistons 14, 28 and the entraining portion 34 move in a direction to the right to stress the resilient element 36; such axial movement is terminated when the collar 50 engages the left-hand end face of the first piston 32. Thus, the axial movement (shifting) of the three pistons is completed when the first piston 32 abuts the stop 46 and the collar 50 abuts the piston 32. The then bias of the resilient element 36 (to urge the piston 32 against the stop 46) exceeds the then bias of the resilient element 44 to a desired extent to thus ensure that the just described axial positions of the pistons remain unchanged even if the bias of the resilient element 44 and/or 36 departs from an optimum value, and even if the fluid pressure in the chamber 44 and/or 38 departs (to a certain extent) from an optimum value.

The mutual axial positions of the pistons 14, 28, 32 shown in FIG. 3 correspond to those shown in FIG. 2 except that the entire piston assembly 12 is located to the right of the position shown in FIG. 2.

(4) The chamber 18 in the housing 10 of the cylinder and piston unit shown in FIG. 4 is connected to the source 24 of pressurized fluid and the chamber 38 communicates with the source 26. The piston assembly 12 is shifted in a direction to the right because pressurized fluid in the chamber 18 acts upon the adjacent surface of the piston 14. This causes the shaft 30 to entrain its collar 50 through the central opening of the first stop 46. The collar 50 entrains the piston 32 and causes the latter to abut the (second) stop 48.

The extent of rightward axial movement of the piston 14 can be such that the resilient element 44 in the chamber 18 dissipates all of the stored energy. Here, again, the piston 32 and the pistons 14, 28 are caused to remain in the axial positions of FIG. 4 even if the pressure of fluid in the chamber 18 departs from an optimum pressure, even if the bias of the then stressed resilient element 36 departs from an optimum bias, and/or even if the pressure of fluid in the chamber 38 is above zero pressure.

To summarize: The effective areas of surfaces of the three pistons 14, 28, 32, the positions of the stops 19, 46, 48 and entraining portion 34, the characteristics of the resilient elements 36, 44, the fluid pressure in the chambers 18, 38, and the position of the collar 50 can be selected with a view to ensure that the piston assembly 12 can be moved to and retained in each of four different (accurately determined) positions with a degree of reliability which suffices to overcome the effects of rather substantial departures of fluid pressure in the chamber 18 and/or 38 from an optimum pressure as well as to overcome the effects of rather pronounced departures of the bias of the resilient element 36 and/or 44 from an optimum bias.

Furthermore, the selection of any one of the four different positions is a very simple procedure because this merely involves an adjustment or resetting of the valve 22 and/or 42. In fact, a single valve can be utilized to regulate the flow of fluid into and from the chambers 18, 38.

Still further, it is possible to resort to a time function in order to determine the length of intervals which elapse between changes of settings of the valves 22, 42 and the instants when the piston assembly 12 reaches the corresponding ones of the aforediscussed plurality of positions. This renders it possible to completely dispense with monitoring of the positions of the piston assembly 12 because one can readily and safely assume that the piston assembly did indeed assume the selected position after elapse of a preset time interval following the adjustment of the valve 22 and/or 42 to a position which is required to locate the piston assembly in the position of FIG. 1, 2, 3 or 4.

FIGS. 5 to 8 illustrate a presently preferred manner in which the valve assembly 12 can be utilized in order to shift an automobile transmission into a selected gear or to select a desired gear ratio preparatory to shifting. Those Parts of the cylinder and piston unit shown in FIGS. 5 to 8 which are identical with or clearly analogous to the corresponding parts of the aforedescribed unit of FIGS. 1 to 4 are denoted by reference characters identical with those utilized in FIG. 1.

The only readily discernible difference between the unit of FIGS. 1 to 4 and the unit of FIGS. 5 to 8 is that the latter unit comprises a housing or cylinder or body 10 having a different median portion 60. The axial positions of the pistons 14, 28, 32 of the piston assembly 12 shown in FIGS. 5, 6, 7 and 8 respectively correspond to those of of the pistons shown in FIGS. 1, 2, 3 and 4.

Figure 5:
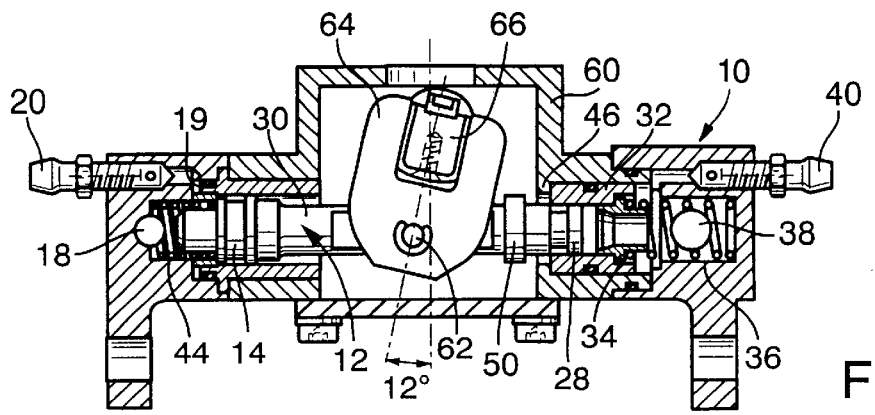
FIG. 5 shows a modified cylinder and piston unit wherein the pistons of the piston assembly assume positions corresponding to those shown in FIG. 1 and wherein two pistons of the assembly are coupled to an adjustable constituent of a change-speed transmission.
Figure 6:
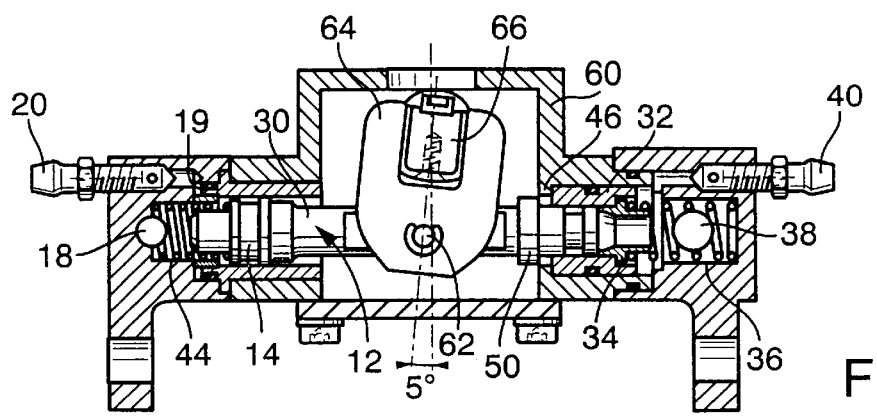
FIG. 6 shows the structure of FIG. 5 with the pistons in positions corresponding to those shown in FIG. 2.
Figure 7:
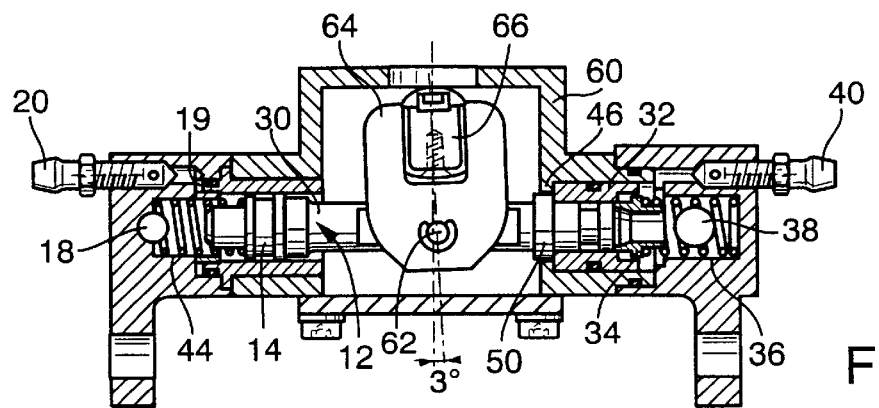
FIG. 7 shows the structure of FIG. 5 with the pistons in positions corresponding to those shown in FIG. 3.
Figure 8:
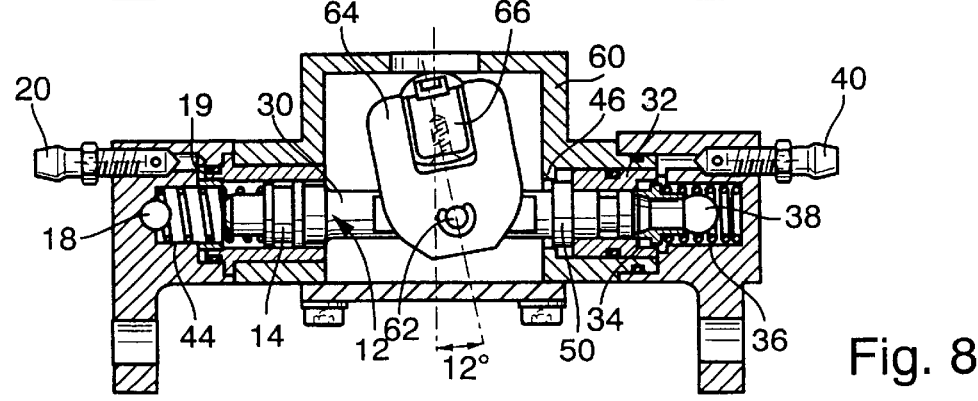
FIG. 8 shows the structure of FIG. 5 with the pistons in positions corresponding to those shown in FIG. 4.

The shaft 30 which connects the pistons 14, 28 in the assembly 12 of FIG. 5 carries a pivot pin 62 for an actuator 64 which can change the position of a shaft 66 forming part of a change-speed transmission. The selected position of the shaft 66 determines the selected one of several shifting paths for the gear shifting system of the transmission which is assumed to have five forward gears, a neutral gear and a reverse gear. The transmission which includes the shaft 66 shown in FIGS. 5 to 8 is provided with four shifting paths. FIG. 5 shows the shaft 66 in an angular position in which the transmission can be shifted into the fifth forward gear. FIG. 6 shows the shaft 66 in a different position in which the transmission is shiftable into the third or fourth forward gear; FIG. 7 shows the shaft 66 in a position in which the transmission is shiftable into the first or second gear; and FIG. 8 shows the shaft 66 in a position or orientation in which the transmission can be shifted into reverse gear. It will be seen that the cylinder and piston unit of FIGS. 1 to 4 can be converted into a gear ratio selecting unit by the simple expedient of coupling the shaft 30 with the shaft 66 by way of the connection including the parts 62, 64 or any other suitable connection. This results in considerable savings in initial cost, maintenance cost and space requirements by simultaneously ensuring reliable retention of the transmission shaft 66 in any one of the plural positions shown in FIGS. 5 to 8.

The transmission embodying the shaft 66 is assumed to constitute an automated transmission; the valves 22, 42 (not shown in FIGS. 5 to 8) are actuatable by a control unit (not shown) to effect a movement of the shaft 66 to the desired position, i.e., to shift the transmission into a selected gear, e.g., in response to signals transmitted to the control unit by one or more devices which monitor the RPM, the linear displacement, another displacement, the load and/or other variables in the power train of a motor vehicle.

In each of the illustrated embodiments, the pressurized fluid supplied by the source 24 via valve 22 and/or 42 performs at least two important functions, namely to shift the piston assembly 12 relative to the housing 10 of the cylinder and piston unit, and to shift (or assist in the shifting of) the piston 32 and the pistons 14, 28 relative to each other in such a way that the shifting of the piston 32 and pistons 14, 28 relative to each other determines at least one of the plural positions of the piston assembly 12 relative to the housing 10. The provision of the piston 32 in addition to the pistons 14, 28 renders it possible to increase the number of different positions of the piston assembly 12 relative to the housing 10. Such positions can include a first position in which the pistons 14, 28 are located at one end of the housing 10, a second position in which the pistons 14, 28 are located at the other end of the housing, and one or more intermediate positions. The pistons 14, 28 can reach at least one of the first and second positions without assistance from the piston 32, e.g., solely in response to the introduction of pressurized fluid into the chamber 18 or 38. The additional position(s) can be established, for example, by admitting pressurized fluid into both chambers and by relying on the movability of the piston 32 and the pistons 14, 28 relative to each other.

The improved cylinder and piston unit is susceptible of numerous modifications without departing from the spirit of the invention, For example, the housing 10 (or an equivalent housing) can be designed to define three or more fluid receiving chambers, the number and/or shape and/or bias of the resilient elements can be varied within a wide range, and the dimensions of the pistons (including the areas of their fluid-contacting surfaces) as well as the dimensions of other parts of the improved cylinder and piston unit can be varied in dependency upon the intended use and/or in dependency on the magnitude and/or range of forces which are to be resorted to in order to maintain the pistons in their selected positions. Furthermore, the shape, the number and/or the positions and/or locations of the various stops and/or entraining portion(s) can be altered in dependency upon the number of different piston positions and the distances between various positions.

Still further, two or more discrete pistons (such as 14 or 28 and 32) can be utilized in lieu of the shaft 30 to transmit motion to one, two or more constituents of a transmission or another system wherein one or more parts are to be moved to two or more predetermined positions and retained in such positions with a required force.

The fluid-operated part of the improved cylinder and piston unit is also susceptible of numerous modifications within the spirit and scope of the instant invention. The illustrated units are preferred in many instances because they can operate quite satisfactorily with a single source of pressurized fluid and with a single source of non-pressurized fluid. Moreover, the illustrated fluid-operated Part is simple and surprisingly unffected by fluctuations of fluid pressure. The same holds true for the resilient elements which are shown in the drawings or for analogous resilient elements.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of regulating methods and apparatus and, therefore, such adaptations should and are intended to be comprehended within the meaning and range of equivalence of the appended claims.

What is claimed is:

1. A method of locating an assembly of plural pistons in at least two different positions in a housing forming part of a fluid-operated cylinder and piston unit and having (a) a plurality of chambers with ports for selective admission and evacuation of a fluid at a selected one of a plurality of different pressures within a predetermined range of pressures and (b) a plurality of stops for a first piston of the assembly, comprising the steps of:

introducing pressurized fluid into one of the chambers to thus move the first piston against a first one of the plurality of stops;

introducing pressurized fluid into another of the chambers to thus move the first piston against a second one of the plurality of stops;

altering the pressure of fluid in at least one of the chambers to thereby move at least one other piston of the assembly into abutment with the first piston while the first piston abuts one of the first and second stops to thus determine one of said plurality of different positions; and altering the pressure of fluid in at least one of the chambers to thereby move the at least one other piston into abutment with the first piston while the first piston abuts the other of the first and second stops to thus determine another one of said plurality of positions.

2. A cylinder and piston unit comprising:

a housing having a plurality of chambers, ports communicating with said chambers, and spaced-apart first and second stops;

means for supplying to and for receiving from said ports a fluid at selected ones of a plurality of pressures within a range of different pressures; and a piston assembly including a first piston movable in said housing between the first and second positions of abutment with said first and second stops, respectively, in response to a change of fluid pressure in at least one second piston movable in said housing relative to said first piston in at least one of said first and second positions of the first piston in response to changes of fluid pressure in at least one of said chambers, wherein at least one of said pistons forms part of a change-speed transmission.

3. The unit of claim 2, wherein said assembly further comprises a third piston movable in said housing with said second piston, each of said pistons having a surface which is being acted upon by fluid in one of said chambers and the surface of at least one of said pistons having an area different from the area of the surface of at least one other piston.

4. The unit of claim 3, wherein thie areas of said surfaces and the positions of said surfaces relative to said chambers are such that the admission of pressurized fluid into said chambers entails a movement of said first piston against one of said first and second stops and a movement of said second and third pistons to a first position relative to said first piston, the admission of pressurized fluid into one of said chambers entails a movement of said first piston against the other of said first and second stops, and the admission of pressurized fluid into another of said chambers entails a movement of said second and third pistons against a further stop in said housing.

5. The unit of claim 3, wherein the area of the surface of said third piston is smaller than the area of the surface of second piston and the surfaces of said first and third pistons are acted upon by fluid in one of said chambers.

6. The unit of claim 3, further comprising a first resilient element arranged to urge said first piston in a first direction against said first stop, and a second resilient element arranged to urge said second and third pistons in a second direction counter to said first direction.

7. The unit of claim 6, wherein each of said resilient elements is at least partially confined in a different one of said chambers.

8. The unit of claim 6, wherein said first piston abuts against said first stop with a predetermined force under the action of said resilient elements when the fluid in said chambers is not pressurized.

9. The unit of claim 6, wherein the area of the surface of said third piston is smaller than the area of the surface of said second piston and the surfaces of said first and third pistons are acted upon by fluid in one of said chambers, one of said resilient elements being disposed in said one chamber and the bias upon said third piston in said second direction being effective to increase the volume of said one chamber.

10. The unit of claim 9, wherein one of said resilient elements is arranged to bias said first piston against said first stop.

11. The unit of claim 3, wherein the area of the surface of said third piston is smaller than the area of the surface of said second piston, said chambers including first and second chambers respectively adjacent said second and third pistons and said second and third pistons being arranged to assume relative to said housing four different positions in the first of which the second chamber contains pressurized fluid to maintain one of said second and third pistons in abutment with a third stop of said housing, in the second of which neither of said chambers contains pressurized fluid, in the third of which said chambers contain pressurized fluid and an entraining portion of one of said second and third pistons abuts said first piston, and in the fourth of which the first chamber contains pressurized fluid and said first piston abuts said second stop.

12. The unit of claim 3, wherein the area of the surface of said third piston is smaller than the area of the surface of said second piston, said first piston including a sleeve having an external surface slidable along an internal surface of said housing and an internal surface slidable along an external surface of said third piston, and further comprising a resilient element provided in said one chamber to bias an entraining portion of said third piston against said first piston and to thus urge said first piston against said first stop.

13. The unit of claim 12, further comprising a second resilient element provided in another one of said chambers to bias said second piston in a direction to move said entraining portion away from said first piston.

14. The unit of claim 3, further comprising resilient elements provided in said chambers to bias said second piston in a first direction and to bias said third piston in a second direction counter to said first direction, the bias of said resilient elements and the areas of the surfaces of said pistons being such that, when the pressure of fluid in said chambers is maintained at predetermined values, said pistons assume and are maintained with predetermined forces in each of a plurality of different positions relative to said housing.

15. The unit of claim 14, wherein at least one of said pistons abuts one of said stops in each of said plurality of different positions of said pistons relative to said housing.

16. The unit of claim 2, wherein the transmission is shiftable into a plurality of different gears in response to movement of said at least one piston relative to said housing.

* * * * *